June 11, 1929. A. D. PETTEE 1,716,384
METHOD AND APPARATUS FOR LUBRICATING DUCTS
Filed July 3, 1926
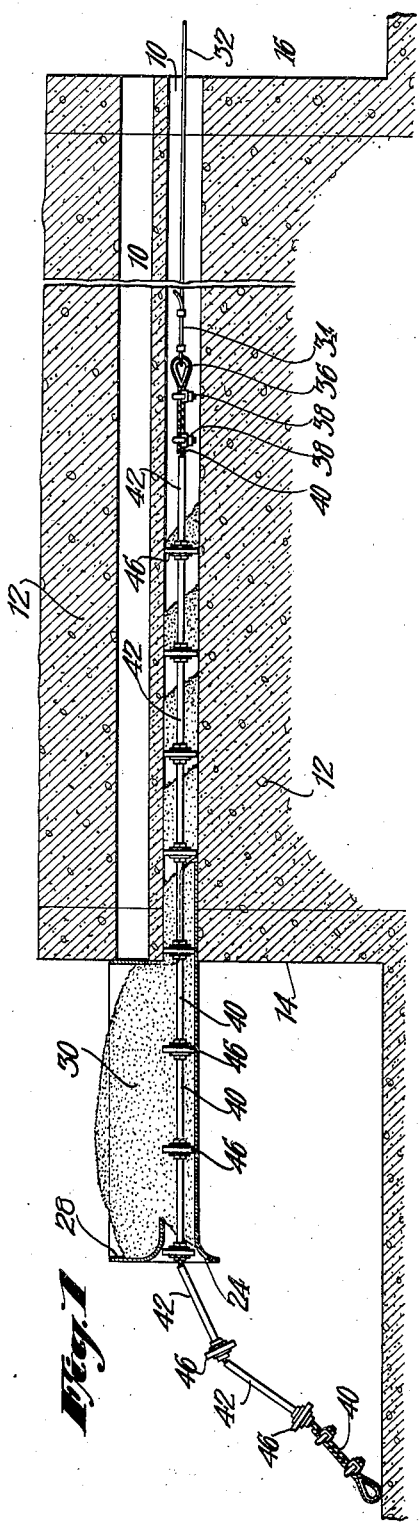
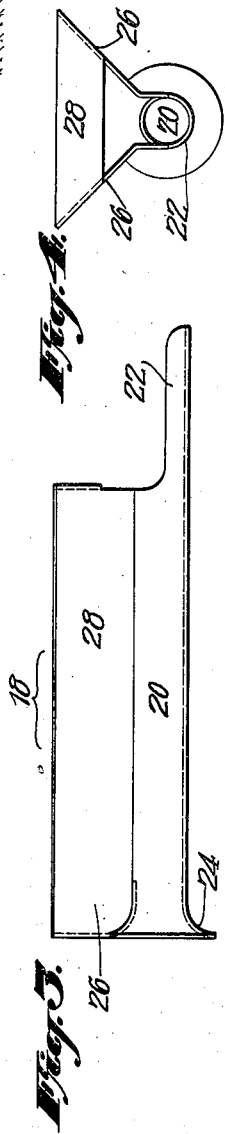
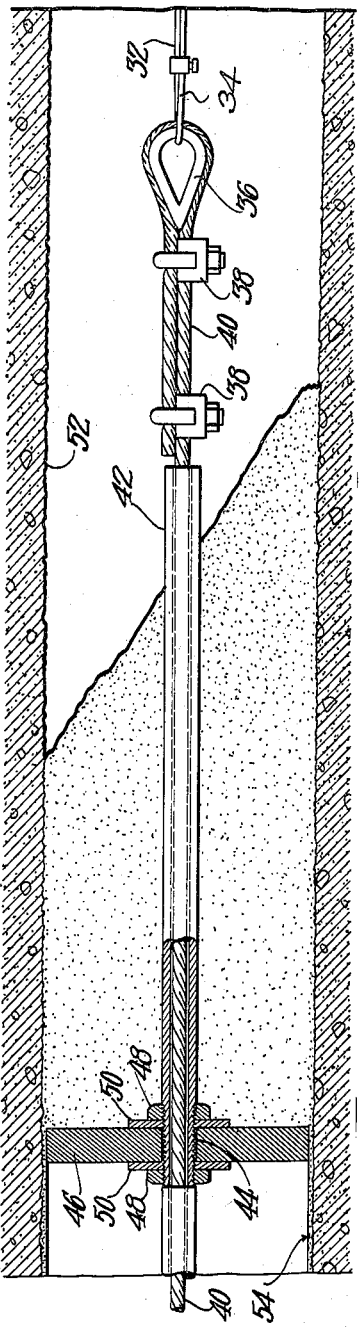
Inventor
ALLEN D. PETTEE.
By his Attorney Patented June 11, 1929.

1,716,384

UNITED STATES PATENT OFFICE.

ALLEN D. PETTEE, OF MOUNT VERNON, NEW YORK, ASSIGNOR TO THOMAS E. MURRAY, OF BROOKLYN, NEW YORK.

METHOD AND APPARATUS FOR LUBRICATING DUCTS.

Application filed July 3, 1926. Serial No. 120,258.

This invention relates to an improved method and means for applying lubricant to the wall of a duct of great length. While not limited thereto, the invention is particularly well suited for applying a lubricant to the walls of ducts cast in concrete such as used to house underground electric cables. Such cables are frequently enclosed in a sheath of lead or other protective material. Frequently, such cables are fished through conduits extending the full length of a city block.

The labor required in threading the cables through such ducts is greatly lessened by the application of a suitable lubricant to the walls of the duct. My invention aims to provide an improved method and apparatus for distributing a substantially uniform layer or coating of lubricant throughout the entire length of such a duct so as to facilitate the passage of the wires or cables therethrough.

The invention will be fully apparent from the following specification when read in connection with the accompanying drawings and the points of novelty defined with particularity in the appended claims.

In the drawings—

Fig. 1 is a longitudinal vertical section illustrating the novel apparatus for carrying out my improved method;

Fig. 2 is an enlarged section showing details of construction and also illustrating the manner of distributing the lubricant;

Fig. 3 is a side elevation of the lubricant container shown in Fig. 1;

Fig. 4 is an end view of the container.

Referring in detail to the drawings, the numerals 10—10 represent ducts moulded or otherwise formed in a body of concrete 12, said ducts extending from manholes 14 and 16 which are separated from one another by a considerable distance.

For holding a suitable supply of lubricant, I provide a container 18, the lower portion 20 of which is substantially cylindrical and which terminates in its forward end in a spout 22 adapted to be inserted for a short distance in the one end of the duct. The end of the container opposite the spout is flared outwardly as at 24 so as to facilitate the entrance of feed discs hereinafter referred to. The sides 26 of the container are flared transversely so as to form a hopper portion 28 which is adapted to retain a generous supply of lubricant 30. In carrying out my method, I first thread a pilot wire 32 from the manhole 16 to the manhole 14 and fasten the end 34 thereof to a thimble 36 which is secured by suitable clamps 38 to a cable 40. A plurality of separate tubular members 42 are threaded on the cable 40 and loosely engage the latter. The tubular members 42 fit the cable quite loosely so that the entire ensemblage is quite flexible so as to permit the apparatus to be used on curved ducts as well as straight ducts. One end of each tubular member 42 is threaded as at 44 and near the threaded end is mounted a disc 46 preferably of rubber or other flexible material. These discs are detachably secured to the tubular member by means of suitable clamp nuts 48 which engage washers 50 on opposite sides of each disc.

By pulling the pilot wire 32, it is apparent that the discs 46 will successively enter the flared portion 24 of the container and that each disc will progressively withdraw a small quantity of lubricant from the container and distribute it throughout the length. Thus the comparatively rough or irregular surface 52 of the duct will have a thin comparatively uniform coating 54 of lubricant applied thereto so that when the electric wires or cables are drawn into the duct the friction tending to retard the passage is greatly reduced.

While not limited thereto, I prefer to use soapstone in a pulverulent form as a lubricant because it very effectively fills up voids in the surface of the duct and provides an even yielding bed or foundation for the electrical conductors. Soapstone makes a very efficient lubricant for use in ducts cast in concrete but it is to be understood that I may use other lubricants such as grease, graphite or the like. Instead of using a cable for pulling through the discs or plungers, I may substitute a chain or series of links or pipes. And instead of pulling the lubricant through by the discs as above shown, I may pass a flexible tube or hose through the conduit and discharge the lubricant from the end of the tube while it is being pulled out, thus progressively distributing the lubricant throughout the length of said duct.

Various modifications may be made by those skilled in the art without departure from the invention as defined in the appended claims.

What I claim is:—

1. A duct lubricating apparatus comprising a container adapted to hold a supply of soapstone or similar pulverulent lubricant, a plurality of flexible discs, tubular members for supporting said discs in spaced relationship, and a flexible member for pulling said discs through a duct.

2. A duct lubricating apparatus comprising a container adapted to hold a supply of soapstone or similar pulverulent lubricant, a plurality of discs, tubular members for supporting said discs in spaced relationship and a flexible member for pulling said discs through a duct.

3. In the lubricating of a cementitious duct, the method which consists in progressively pulling small quantities of powdery lubricant through the duct so as to uniformly distribute a thin coating of powdery lubricant over the wall thereof.

4. In the lubricating of a cementitious duct, the method which consists in distributing a thin coating of pulverulent soapstone over the wall of the duct.

5. In the lubricating of a cementitious duct, the method which consists in progressively distributing a lubricant throughout the length of the duct.

6. In the lubricating of a duct, the method which consists in simultaneously pulling a tube through the duct and extruding a lubricant therefrom.

In witness whereof, I have hereunto signed my name.

ALLEN D. PETTEE.